United States Patent
Stengler et al.

(10) Patent No.: US 11,441,775 B2
(45) Date of Patent: Sep. 13, 2022

(54) HEAT RECOVERY UNIT

(71) Applicant: INLINE HEAT RECOVERY INC., Turner Valley (CA)

(72) Inventors: Matthew Stengler, Calgary (CA); Andrew Lapaire, Calgary (CA)

(*) Notice: Subject to any disclaimer, the term of this patent is extended or adjusted under 35 U.S.C. 154(b) by 146 days.

(21) Appl. No.: 16/933,112

(22) Filed: Jul. 20, 2020

(65) Prior Publication Data

US 2021/0025590 A1 Jan. 28, 2021

(51) Int. Cl.
| | |
|---|---|
| F23J 15/06 | (2006.01) |
| F23L 15/02 | (2006.01) |
| F28D 7/16 | (2006.01) |
| F28D 17/02 | (2006.01) |
| F28D 19/04 | (2006.01) |
| F24F 12/00 | (2006.01) |
| F28D 21/00 | (2006.01) |

(52) U.S. Cl.
CPC ............... *F23J 15/06* (2013.01); *F23L 15/02* (2013.01); *F28D 7/1669* (2013.01); *F28D 17/02* (2013.01); *F28D 19/041* (2013.01); *F24F 12/00* (2013.01); *F24F 2012/008* (2013.01); *F28D 21/0008* (2013.01)

(58) Field of Classification Search
CPC ......... F23J 15/06; F23L 15/02; F28D 7/1669; F28D 17/02; F28D 19/041; F28D 21/0008; F28D 19/04; F24F 12/00; F24F 2203/104
USPC .............................................................. 165/6
See application file for complete search history.

(56) References Cited

U.S. PATENT DOCUMENTS

| | | | |
|---|---|---|---|
| 1,833,166 | A | 11/1931 | Lucke |
| 3,894,579 | A | 7/1975 | Brille |
| 4,093,435 | A | 6/1978 | Marron et al. |
| 4,391,321 | A | 7/1983 | Thunberg |

(Continued)

FOREIGN PATENT DOCUMENTS

| | | |
|---|---|---|
| CH | 696369 A5 | 5/2007 |
| EP | 0449783 B1 | 1/2008 |

(Continued)

OTHER PUBLICATIONS

Nortek Air Solutions, LLC "Frost Prevention vs. Frost Control" Feb. 2016.
ARIA Brands Inc. "130 ERVD Energy Recovery Ventilator" Jan. 26, 2017.
Residential Product Group "Heat Recovery Ventilator and Energy Recovery Ventilator" published before May 30, 2017.

(Continued)

*Primary Examiner* — Jon T. Schermerhorn, Jr.
(74) *Attorney, Agent, or Firm* — Shin Hung; VanTek IP LLP

(57) ABSTRACT

A compact heat recovery unit which includes separate and distinct thermal cores housed in their own channels. Each thermal core and its respective channel is moved at intervals. When a thermal core and its channel is inserted into a high temperature fluid flow, the thermal core absorbs the heat. When this heated thermal core and its channel is then later inserted into a low temperature fluid flow, the low temperature fluid is preheated by the heated thermal core. This operation is repeated with at least two independent thermal cores and their respective channels to maintain substantially continual pre-heating of received low temperature fluid. Similarly, the compact heat recovery unit can be used in a cooling application where pre-cooling of received higher temperature fluid is executed.

20 Claims, 9 Drawing Sheets

(56) References Cited

U.S. PATENT DOCUMENTS

| | | | |
|---|---|---|---|
| 5,165,466 A * | 11/1992 | Arbabian | F24D 11/00 |
| | | | 165/4 |
| 6,119,764 A * | 9/2000 | Karlsson | G01B 13/12 |
| | | | 165/8 |
| 7,819,176 B2 | 10/2010 | Kaser et al. | |
| 7,841,381 B2 | 11/2010 | Chagnot et al. | |
| 7,849,913 B2 * | 12/2010 | Struensee | F28D 19/047 |
| | | | 165/4 |
| 7,865,074 B2 * | 1/2011 | Seo | F28D 19/041 |
| | | | 392/485 |
| 8,973,649 B2 * | 3/2015 | Yang | F24F 3/1417 |
| | | | 165/4 |
| 9,470,432 B2 | 10/2016 | Stenfors | |
| 9,664,454 B2 | 5/2017 | Stenfors | |
| 2001/0013404 A1 * | 8/2001 | Lagace | F24F 3/1423 |
| | | | 165/8 |
| 2008/0223545 A1 | 9/2008 | Nunes et al. | |
| 2013/0140777 A1 | 6/2013 | Erb et al. | |

FOREIGN PATENT DOCUMENTS

| | | |
|---|---|---|
| EP | 0959307 B1 | 4/2008 |
| EP | 1962030 B1 | 8/2016 |
| GB | 2 061 477 A | 5/1981 |
| JP | S59 93188 A | 5/1984 |
| WO | 2005073656 A1 | 8/2005 |
| WO | 2019/224563 A1 | 11/2019 |

OTHER PUBLICATIONS

Klingenburg USA, LLC "Rotary Heat Exchangers How they Work" published before May 30, 2017.

Nortek Air Solutions, LLC "Frost Control Strategies" Engineering Bulletin, Jul. 2015.

Extended European Search Report dated Nov. 11, 2020, issued in respect of corresponding European Patent Application No. 20187334.6.

* cited by examiner

HEAT RECOVERY UNIT

CROSS REFERENCE TO RELATED APPLICATIONS

This application claims the benefit of priority of Canadian patent number 3050503 filed Jul. 24, 2019, which is incorporated herein by reference.

The present disclosure relates generally to heat recovery units for extracting heat from one fluid and transferring the extracted heat to another fluid. More particularly, the present disclosure relates to preheating external air for residential or commercial ventilation systems.

BACKGROUND

In order to maintain the interior of buildings or rooms at a comfortable temperature for people or animals when the outdoor environment is too cool, a heating system is employed that generates warm air which can be circulated within the rooms.

A common type of heating system is a forced air natural gas furnace system typically employed in residential homes. In its operation, the gas furnace ignites natural gas fed with external cool air to initiate combustion flames, which warms a heat exchanger. A blower in the furnace draws in air from within the home and circulates it over the heat exchanger. The cooled air is then warmed and blown into rooms of the home via a distributed piping or duct system. The combustion byproducts of the natural gas furnace are vented outside of the home via another piping system.

The heating efficiency of such systems can be increased if the external cool air for combustion can be preheated by using the combustion byproducts of the natural gas furnace, which should be much higher in temperature than the cool air. Although a natural gas furnace is discussed in this example, other fire-based appliances using different fuels can be used as well, such as for example wood pellet based furnaces. Studies in this field have shown that preheating combustion air can reduce heating energy use by as much as 30%.

Larger commercial buildings employ heat recovery units for exactly this purpose. Currently one of the most effective and popular regenerative heat/moisture recovery units utilize a heat wheel that consists of a single circular thermal mass/core that is in constant motion during operation. It should be noted that heat is understood as energy transfer to or from a system, while heating is understood as generating warmth or increasing a temperature.

An example heat wheel based system is shown in FIG. 1 and FIG. 2. Such heat wheels are also referred to as thermal wheels. FIG. 1 shows a side view of the housing including a heat wheel. FIG. 2 is a front or rear view of the housing of FIG. 1. The housing includes a first channel 10, a second channel 12, a heat wheel frame 14 and a heat wheel 16. The first channel 10 includes a dedicated housing for receiving cool air from the outside and distributing preheated air to a burner. The second channel 12 includes another dedicated housing for receiving warm exhaust air from the burner and passing it to the outside. The frame 14 supports the heat wheel 16 within the housing and includes the necessary components, such as a motor, to continually rotate the heat wheel in either the clockwise or counterclockwise directions. In particular, the heat wheel 16 is positioned such that half of the wheel is in channel 10 and the other half is in channel 12 at all times.

In operation, the warm exhaust air from the burner flows through the rotating heat wheel 16 via channel 12, and in doing so heats the thermally conductive core of the heat wheel 16. The exhaust air that passes through the heat wheel 16 is then vented to the outside. As the warm portion of the heat wheel 16 rotates into channel 10, cool air from the outside passes through the heated core and is preheated. This preheated air is then passed to the burner. As can be appreciated by persons of skill in the art, increased thermal efficiency of the combustion process is attained, which results in downstream cost savings.

These heat wheel based systems are not suited for residential home use due to their large size. Furthermore, there are existing disadvantages to heat wheel based systems.

The heat wheel design consists of a single circular thermal mass that is in constant motion during operation. Because of this, contact seals which separate the different air channels, such as channels 10 and 12 in FIG. 1 and FIG. 2, can be prone to wear and non-contact seals are prone to cross contamination. Also, in heating, ventilation and air conditioning (HVAC) applications, extremely low temperatures can be present, therefore preheating the incoming cold air must be incorporated or heat wheel rotation must be slowed down to prevent frost build-up. Both of these compensation techniques reduce the energy efficiency of the heat wheel.

An alternate heat recovery unit includes a pair of stationary thermal cores in a housing, instead of a rotating heat wheel. Because the thermal cores are stationary, a complex set of flaps/louvres must be controlled to reroute the air channel pathways in order to alternate the functions of each thermal mass/core. Because of this added complexity where components must be added externally to facilitate airflow reversal through the thermal cores, overall size and complexity of the heat recovery unit makes it unsuited for residential use. Furthermore, the additional components typically retain some of the process fluids which can be transferred between air channels during reversal thereby increasing cross contamination.

Yet another alternate heat recovery unit includes heat exchangers, which are typical non-regenerative heat recovery units that use a membrane between process flows to facilitate heat/material transfer. The heat exchanger design maintains constant contact of both air streams with a thermal energy transfer membrane. In HVAC applications, extremely low temperatures are present which typically causes a frost build-up and requires a defrosting cycle. The most common defrosting methods for heat exchangers are exhaust-only defrost and recirculation defrost. Exhaust-only defrost is achieved by temporarily stopping incoming cold air from entering the heat exchanger while warm exhaust air continues to flow, dissipating frost build-up. The drawback of exhaust-only defrost is that there is no energy recovery between air streams for the duration of the defrost cycle. Recirculation defrost is achieved by recirculating the exhaust air stream into the supply air stream, dissipating frost build-up. The drawback of recirculation defrost is that there is exposure to undesirable exhaust elements and no air exchange occurs for the duration of the defrost cycle.

Accordingly, the currently available heat recovery units are unsuited for residential use due to either their size, complexity or other disadvantages as noted above.

SUMMARY

It is an object of the present disclosure to obviate or mitigate at least one disadvantage of previous heat recovery units.

In a first aspect, the present disclosure provides a heat recovery unit for fluids. The heat recovery unit includes first and second internal channels within an external housing, thermally conductive cores within each of the first and the second internal channels and an actuator. In this first aspect, the first and second internal channels are each configured to transfer separate fluid flows between a respective pair of pipe adapters in sealed connection to ends of the external housing, where a first fluid flow includes conditioned fluid and a second fluid flow includes ambient fluid different in temperature than the conditioned fluid. The thermally conductive cores are thermally isolated from each other, where each thermally conductive core transfers thermal energy with the conditioned fluid or with the ambient fluid. The actuator is configured to move the first and the second internal channels between different pairs of the pipe adapters at intervals.

According to an embodiment of the first aspect, the external housing is cylindrical shaped, and the first and second internal channels are semi-circle shaped and connected to each other. In this embodiment, the first and second internal channels are rotatable about a central axis of the cylindrical shaped external housing.

According to another embodiment of the first aspect, each of the pipe adapters has a first opening configured for connection to a pipe, and a second opening configured with a size and shape matching the size and the shape of both the first and the second internal channels.

In yet a further embodiment of the first aspect, the external housing is rectangular shaped and subdivided into a top portion and a bottom portion, where the first internal channel is positioned within and configured to slide in the top portion and the second internal channel is position within and configured to slide in the bottom portion. In this embodiment, the first internal channel and the second internal channel include internal housings rectangular in shape. The first internal housing includes a first blocking flap at an end of the first internal housing extending towards the bottom portion, the second internal housing includes a second blocking flap at another end opposite to the end of the first internal housing extending towards the top portion, the first blocking flap and a first internal housing opening having a combined area matching an area of the second opening of each pipe adapter, and the second blocking flap and a second internal housing opening having a combined area matching the area of the second opening of each pipe adapter.

In yet another embodiment of the first aspect, the heat recovery unit can include a plurality of internal channels including the first and the second internal channels, each of the plurality of internal channels being configured as an internal housing pivotally coupled to adjacent internal housings. Each of the pipe adapters has a first opening configured for connection to a pipe, and a second opening configured with a size and shape matching the size and the shape of a predetermined group of sequential internal housings. In this embodiment, the actuator is configured to move all the internal housings by a distance corresponding to a single internal housing such that exactly one internal housing moves from alignment with the second opening of a first pipe adapter and into alignment with the second opening of a second and adjacent pipe adapter. Alternatively, the actuator is configured to move all the internal housings by a distance corresponding to a multiple of internal housings such that exactly the multiple of internal housings moves from alignment with the second opening of a first pipe adapter and into alignment with the second opening of a second and adjacent pipe adapter. According to a further alternate configuration of the present embodiment, the heat recovery unit can include a pair of purge pipe adapters in sealed connection to ends of the external housing, each having a first opening configured for connection to a pipe and a second opening configured with a size and shape matching the size and the shape of one internal housing.

In a second aspect, the present disclosure provides a system with integrated heat recovery. The system includes a thermal appliance, a first piping system, a second piping system and a heat recovery unit. The thermal appliance is configured to condition a fluid by changing its temperature. The first piping system is configured to transfer the conditioned fluid to the exterior of a structure. The second piping system is configured to transfer ambient temperature fluid from the exterior of the structure to the interior of the structure. The heat recovery unit includes first and second internal channels, thermally conductive cores within each of the first and the second internal channels, and an actuator. The first and second internal channels are within an external housing, each configured to transfer separate fluid flows between a respective pair of pipe adapters in sealed connection to ends of the external housing, where a first fluid flow includes the conditioned fluid and a second fluid flow includes the ambient temperature fluid. The thermally conductive cores are thermally isolated from each other, where each thermally conductive core transfers thermal energy with the conditioned fluid or with the ambient temperature fluid. The actuator is configured to move the first and the second internal channels between different pairs of the pipe adapters at intervals, where one pair of the pipe adapters are connected in line with the first piping system and the other pair of the pipe adapters are connected in line with the second piping system.

According to an embodiment of the second aspect, the thermal appliance includes a fire based appliance, and the ambient temperature fluid is air for feeding the combustion process of the fire based appliance, and the conditioned fluid is combustion exhaust gas.

According to an alternate embodiment of the second aspect, the thermal appliance includes a space heating or cooling device that directly heats or cools air in a structure, where the structure is a dwelling. In this alternate embodiment, the ambient temperature fluid is fresh external air for circulation in the dwelling, and the conditioned fluid is stale, heated or cooled air from within the dwelling.

In a third aspect, the present disclosure provides a method for operating a heat recovery unit for a dwelling. The method includes activating a thermal comfort system; aligning a first internal channel of the heat recovery unit to a fluid outlet for receiving a first fluid from the thermal comfort system; changing the temperature of a first thermally conductive core the first internal channel with the first fluid; switching the first internal channel with a second internal channel of the heat recovery unit having a second thermally conductive core after a predetermined delay of time; and aligning the first internal channel to a fluid inlet for receiving and changing the temperature of a second fluid with the first thermally conductive core.

According to an embodiment of the present method, aligning the first internal channel to a fluid inlet includes concurrently aligning the second internal channel to the fluid outlet. According to another embodiment of the present method, the thermal comfort system is a heating or cooling system, the first fluid is conditioned fluid, and the second fluid is ambient fluid different in temperature than the first fluid.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The present disclosure provides a compact heat recovery unit suited for residential use, which includes separate and distinct thermal cores housed in their own channels. Each thermal core and its respective channel is moved at a predetermined time interval. This predetermined time can be set based on any combination of the known or detected flow rate, temperature, or any other properties of fluid passing through the heat recovery unit at any given time, and therefore can vary from interval to interval if needed. These intervals can therefore be determined by a controller with sensors to monitor at least one of the properties of the fluid passing through any of the thermal cores by example. When a thermal core and its channel is inserted into a high temperature fluid flow, the thermal core absorbs the heat. When this heated thermal core and its channel is then later inserted into a low temperature fluid flow, the low temperature fluid is preheated by the heated thermal core. This operation is repeated with at least two independent thermal cores and their respective channels to maintain substantially continual pre-heating of received low temperature fluid.

For the present description, the term "fluid" is intended to include liquids of any type and gases of any type, as the presently described embodiments can be used in different applications.

Figure 1:
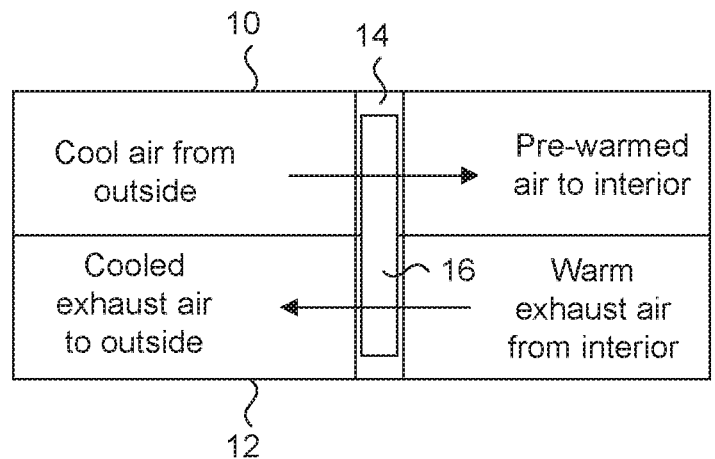
FIG. 1 is a side view of a heat recovery system housing including a heat wheel, according to the prior art.
Figure 2:
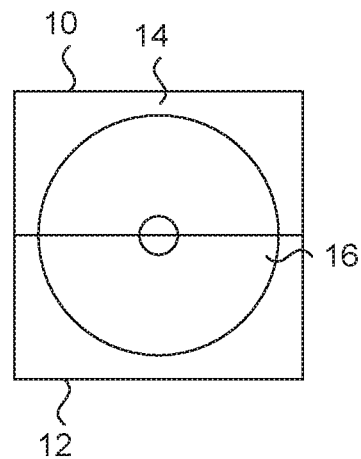
FIG. 2 is a front or rear view of the heat recovery system housing shown in FIG. 1.
Figure 3:
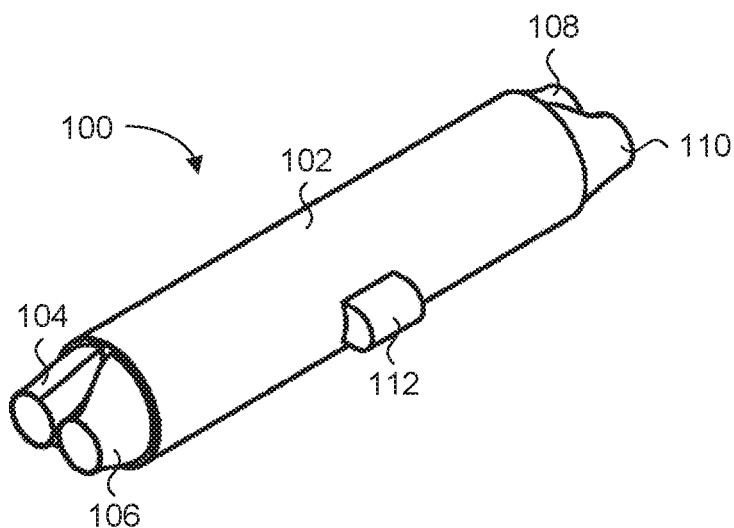
FIG. 3 is a perspective view of a heat recovery unit, according to a present embodiment.
Figure 4:
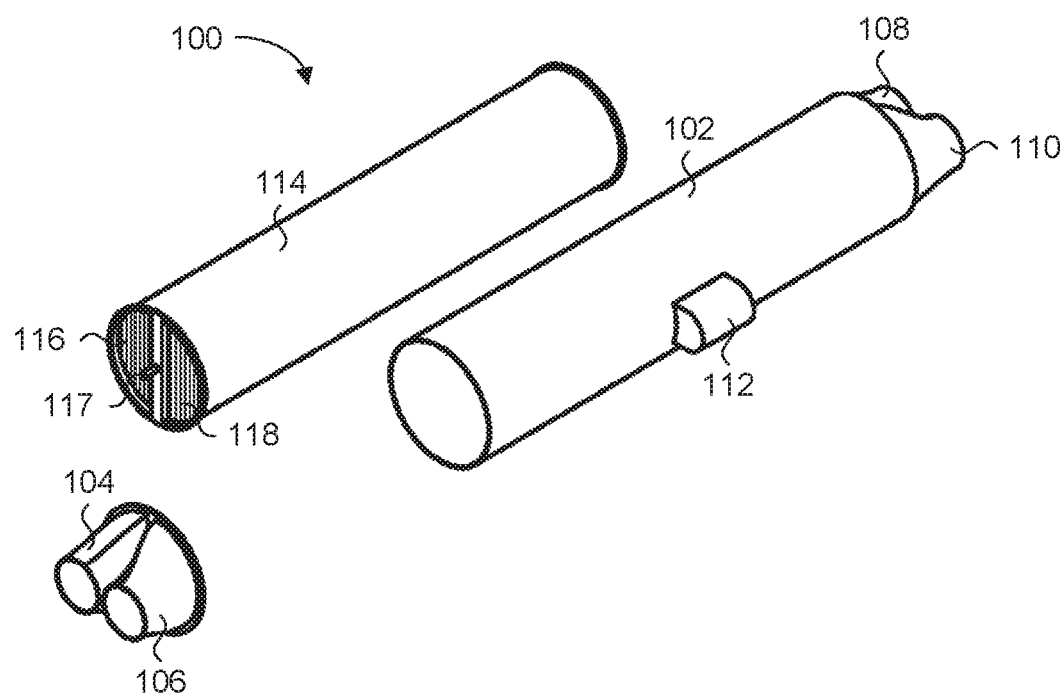
FIG. 4 is an exploded view showing the internal components of the heat recovery unit of FIG. 3, according to the present embodiment.

FIG. 3 is a perspective view of a heat recovery unit according to a present embodiment. FIG. 4 is an exploded view showing the internal components of the heat recovery unit of FIG. 3. The heat recovery unit 100 shown in FIG. 3 includes an external housing 102, pipe adapters 104, 106, 108, 110, and an actuator 112. In FIG. 4, an internal rotatable drum 114 has been shown removed from the external housing 102, with the end cap including pipe adapters 104 and 106 detached from an end of external housing 102. In normal use, the end caps are secured to the ends of the external housing 102.

In the present embodiment, the internal rotatable drum 114 is configured to include a pair of distinct and separate internal channels 116 and 118, each having secured within it a thermally conductive core or set of cores. The thermally conductive cores can be optionally coated or treated to enhance thermal or material transfer or to protect the core material from degradation due to chemical or friction exposure. For example, a desiccant coating can be applied to improve moisture transfer. The thermally conductive cores transfer thermal energy with the fluid that flows through the respective internal channels, where it is well known that heat energy will transfer from an element of higher temperature to an element of lower temperature.

Internal channels 116 and 118 are semi-circle in cross-sectional shape and the thermally conductive cores can be made of aluminum or any other material suited for quickly absorbing and discharging heat. The internal channels 116 and 118 extend to both ends of the internal rotatable drum 114, and the thermally conductive cores are configured to permit fluid flow between both ends of the internal rotatable drum 114. Therefore, it should be pointed out that the internal channels 116 and 118 can have a large aspect ratio, in that they are much longer than they are in width. In the present embodiment, the internal channels 116 and 118 are integrated into a single drum. In an alternate configuration, each internal channel 116 and 118 can be separately formed as a semi-circular tube with the flat portions attached to each other.

The pipe adapters 104, 106 and 108, 110 are presently described as being coupled together in respective end caps. Alternately, they can be separate adapters independently fixed to the ends of the external housing 102. Each of the pipe adapters 104, 106, 108, 110 has a first opening facing away from internal rotatable drum 114 configured for attachment to any standard piping, and a second opening facing towards the internal rotatable drum 114 configured to match the shape of the openings of internal channels 116 and 118. In the present example of FIG. 3 and FIG. 4, these second openings are therefore semi-circle shaped.

Extending from a central axis of the internal rotatable drum 114 at both ends thereof is a shaft 117 which is inserted into holes of the end cap for pipe adapters 104, 106 and the end cap for pipe adapters 108, 110. The overall diameter of the internal rotatable drum 114 is smaller than that of the external housing 102, and the positioning of the shaft with the end caps suspends the internal rotatable drum 114 so that there is no contact with the internal surface of the external housing 102, to thereby minimize friction. Instead of a central pivot, low friction bearings or rollers can be used in between the surfaces of the external housing 102 and of the internal rotatable drum 114.

The actuator 112 can be any type of device that couples to the internal rotatable drum 114 to rotate it either clockwise and/or counterclockwise within the external housing 12. By example, this can include linear motors and stepper motors coupled by a belt or gears to the internal rotatable drum 114. The actuator 112 is symbolically shown as a box attached to the external housing 102, but can be one or more devices in actual implementation to achieve this desired result. The actuator is calibrated to ensure that after rotation, each of internal channels 116 and 118 always have their openings aligned with the second openings of the pipe adapters 104, 106, 108, 110. More specifically, this alignment means that no part of any internal housing opening overlaps two adjacent pipe adapter openings. In the present embodiment, the internal channels 116 and 118 are straight and linear, therefore a respective pair of pipe adapters 104, 108 and 106, 110 are positioned in linear alignment with each other and either of internal channels 116 and 118.

In a possible alternate configuration, the internal channels 116 and 118 do not follow a straight and linear path. By example, each internal channel can be shaped into a twisted path, such that both internal channels 116 and 118 form a helical pattern with each other. Furthermore, the pair of pipe adapter openings at each end of a single channel need not be linearly aligned with each other.

While not shown in the drawings, seals can be used at the interface between the openings of internal channels 116 and 118 with the second openings of the pipe adapters 104, 106, 108, 110, and anywhere that fluid could potentially leak out at.

When assembled as shown in FIG. 3, pipe adapter pair 104, 108 are connected to a first fluid flow piping system (not shown), while pipe adapter pair 106 and 110 are connected to a second fluid flow piping system (not shown). The first and the second fluid flow piping systems are independent. By example, the first fluid flow receives and provides an external fluid, such as cold combustion air into a furnace, while the second fluid flow receives and provides a heated fluid, such as exhaust combustion heat from the furnace. The actuator 112 periodically switches the positions of the internal channels 116 and 118 with respect to the pairs of pipe adapters by rotating the internal rotatable drum 114 by a predetermined number of degrees to ensure that their openings align with the second openings of the pipe adapters.

Figure 5:
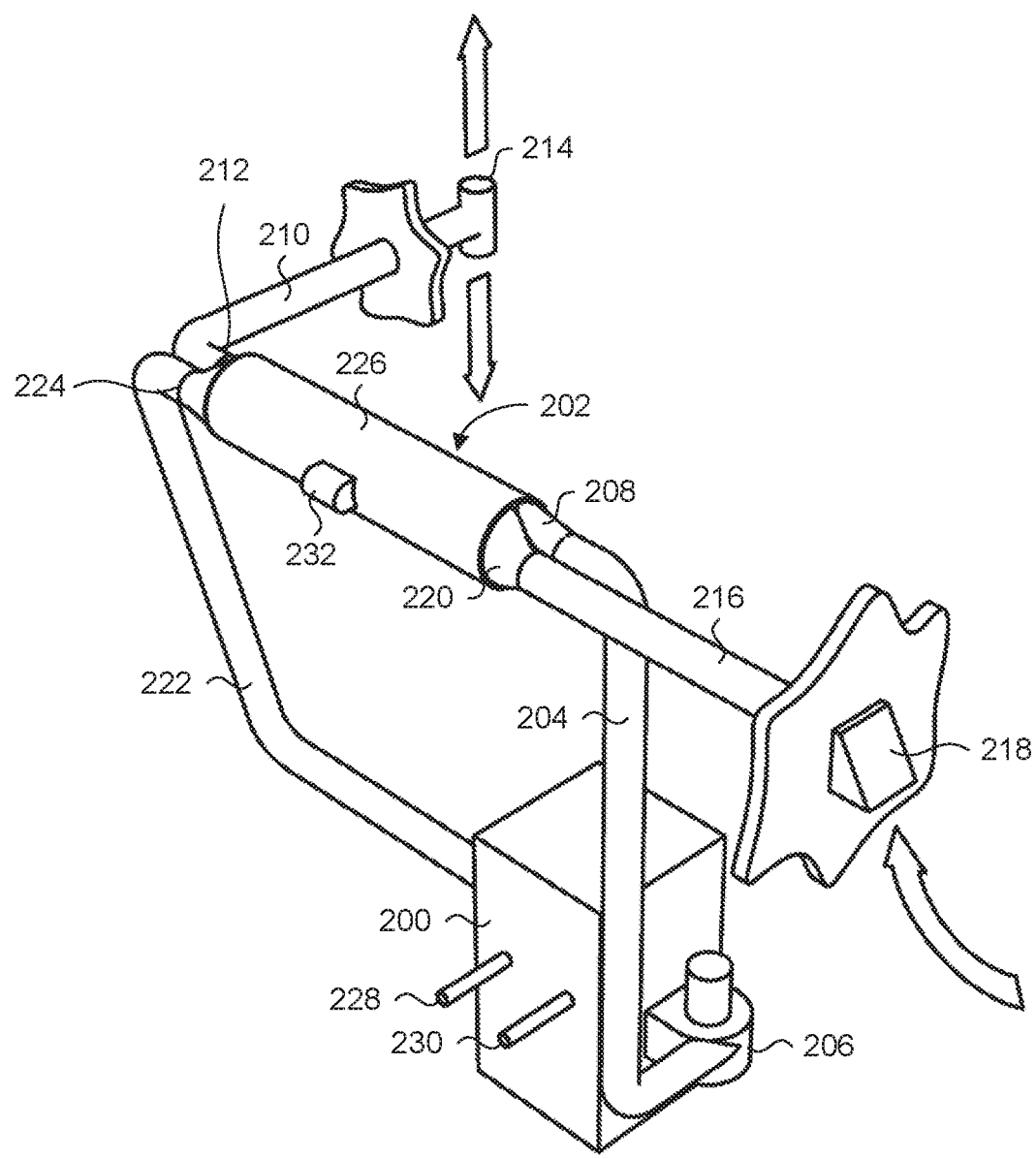
FIG. 5 shows a heating system application of the heat recovery unit of FIG. 3 and FIG. 4, according to a present embodiment.

The operation of the heat recovery unit 100 is now described in an example application of a fire-based appliance, such as for a boiler system, in FIG. 5. Such a system can be used as part of a snow melt system to apply heat to a surface, such as a sidewalk or airport tarmac, to prevent the buildup of ice coverage or to melt any accumulated ice. Typically, tubes carrying warmed liquid are distributed under the surface in such a system.

FIG. 5 illustrates a heating system application of the heat recovery unit 100 shown in FIG. 3 and FIG. 4 for preheating combustion air for a fire based appliance, such as a natural gas boiler by example. In FIG. 5, simplified fluid flow piping systems are shown without all the walls of the building or surrounding structure being shown. To simplify the drawing, only a portion of the walls are shown to delineate the outside versus inside of the building.

In FIG. 5, a fire based appliance 200 installed within the dwelling is connected to a first fluid flow piping system, a second fluid flow piping system, and a heat recovery unit 202. The first fluid flow piping system includes exhaust pipe 204 connected between a fan blower 206 of the appliance 200 and a first opening of pipe adapter 208, and exhaust pipe 210 connected between a first opening of pipe adapter 212 and external port 214 positioned outside of the building. The second fluid flow piping system includes an inlet pipe 216 connected between external port 218 positioned outside of the building and a first opening of pipe adapter 220, and inlet pipe 222 connected between a first opening of pipe adapter 224 and appliance 200. It is assumed that the described exhaust and inlet pipes as well as the external housing 226 are secured to structures of the building.

In the presently shown example, the second fluid flow piping system provides ambient external air to feed combustion in the appliance 200, while the first fluid flow piping system receives and outputs the combustion exhaust of the appliance 202 outside of the building. A separate and distinct piping system includes an inlet pipe 228 for receiving cold glycol solution from the snow melt system return, heating it by the appliance 200, and pumping the heated glycol solution back into the snow melt system from an outlet pipe 230.

At initial startup, it is assumed that the snow melt system has been inactive for some time, therefore all thermally conductive cores of the heat recovery unit 202 are at indoor ambient temperature. As the appliance 200 begins combustion, cool external air is drawn into the appliance 200 via the series connection of external port 218, inlet pipe 216, an internal channel of heat recovery unit 202 and inlet pipe 222. During combustion, the heated exhaust air is vented to outside of the building through the series connection of exhaust pipe 204, and a different internal channel of heat recovery unit 202, exhaust pipe 210 and external port 214. As the heated exhaust air passes through the internal channel aligned to the pair of pipe adapters 208 and 212, its thermally conductive core heats up. At a predetermined time after initial startup, actuator 232 is triggered to quickly rotate then stop, in order to switch the internal channels such that the internal channel with the heated thermally conductive core is now positioned between the pair of pipe adapters 220 and 224.

Now the cool external air from inlet pipe 216 passes through the heated thermally conductive core and is provided as preheated combustion air through inlet pipe 222 for appliance 200. Concurrently, the other thermally conductive core that was initially cool, is heating up by the heated exhaust air from the appliance 200. A controller (not shown) connected to the actuator 232 can be programmed to trigger another switch of the internal channels and their respective thermally conductive cores at a predetermined time. This predetermined time can be set based on any combination of the known flow rate of the heated exhaust air, the received external air, the temperature of the heated exhaust air from exhaust pipe 204, and the temperature of the external air from inlet pipe 216. Temperature and flow rate sensors can be used to provide input for determination by the controller as to when the internal channels should be switched by the actuator 232. Ideally, a thermally conductive core and channel are switched when a maximum temperature of the core is reached, or the rate of increase in temperature of the core falls below a predetermined threshold.

The embodiment of FIG. 5 has been described in an application for warming a liquid to be recirculated in a snow melt system. In an alternate embodiment, the system of FIG. 5 can be configured for forced air heating. Instead of receiving liquid, cool air is received at inlet pipe 228 to be heated by appliance 200, with the heated air being blown out through outlet pipe 230 and into the building or residence.

FIGS. 3, 4 and 5 illustrate an embodiment of a heat recovery unit where the movement for switching internal channels between respective pairs of pipe adapters is based on rotation of the internal channels. According to an alternative embodiment, a sliding movement can be used to switch the internal channels between respective pairs of pipe adapters.

Figure 6:
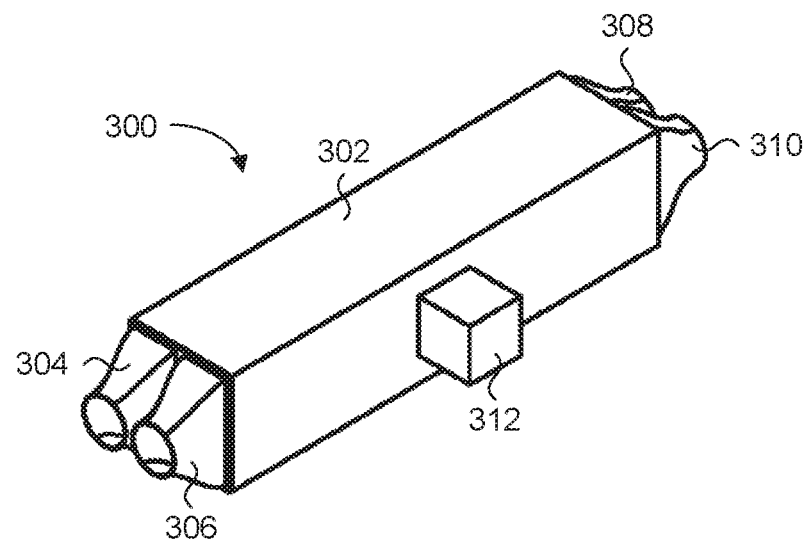
FIG. 6 is a perspective view of a heat recovery unit, according to an alternate present embodiment.
Figure 7:
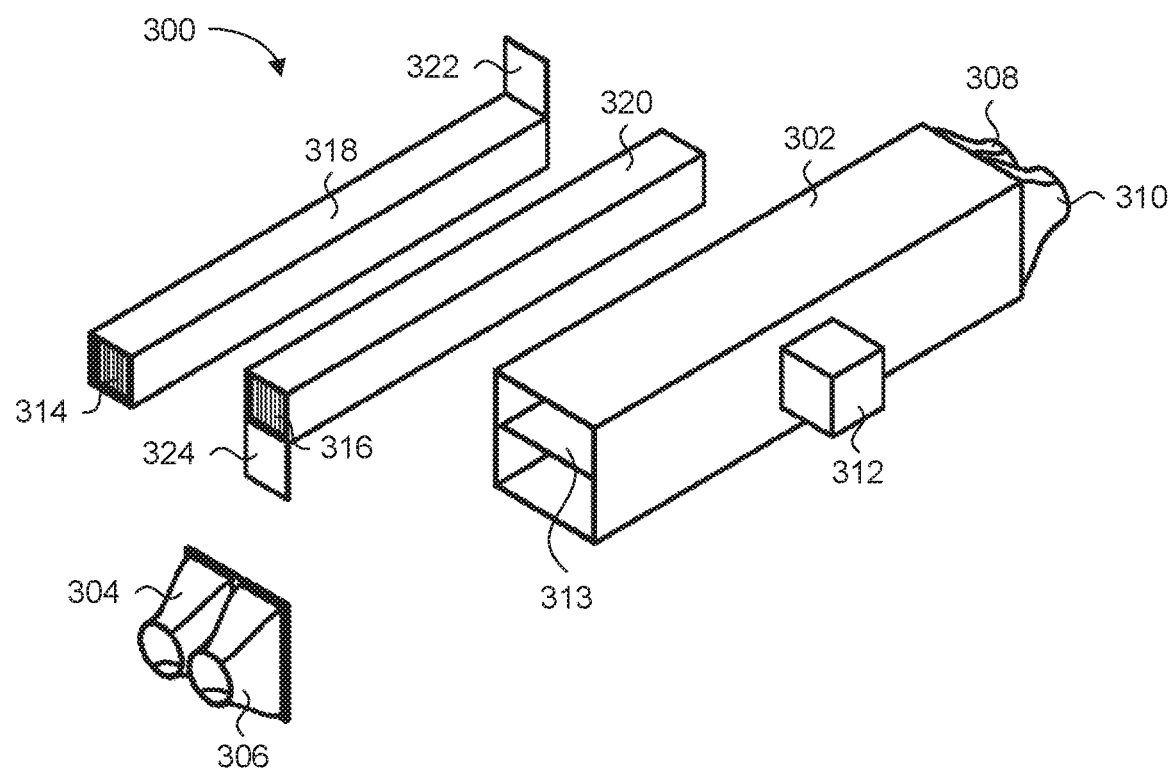
FIG. 7 is an exploded view showing the internal components of the heat recovery unit of FIG. 6, according to the alternate embodiment.

The alternate embodiment of FIG. 6 and FIG. 7 illustrates an example configuration that uses sliding motion to switch the internal channels between respective pairs of pipe adapters.

FIG. 6 is a perspective view of a heat recovery unit according to a present embodiment. FIG. 7 is an exploded view showing the internal components of the heat recovery unit of FIG. 6. The heat recovery unit 300 shown in FIG. 6 includes an external housing 302, pipe adapters 304, 306, 308, 310, and an actuator 312. In the present embodiment of FIG. 6, the heat recovery unit 300 includes a rectangular shaped or square shaped external housing 302.

FIG. 7 shows a horizontal divider 313 which extends from end to end of the external housing 302 and is oriented parallel to the top and bottom surfaces of external housing 302. The horizontal divider 313 bisects the interior of external housing 302 into a top portion and a bottom portion. Positioned within the bottom portion is internal channel 314 and positioned within the top portion is internal channel 316. Both internal channels 314 and 316 have separate internal housings 318 and 320 shaped as rectangular columns. Both internal housings 318 and 320 have the same dimensions, and the length is about the same as the external housing 302. Each internal housing 318 and 320 has a distinct and separate thermally conductive core or set of cores secured therein. These thermally conductive cores can be made of the same materials and receive the same treatments as previously described for the previous embodiment of FIG. 3.

The top portion and bottom portion of the external housing 302 each have a height just greater than the height of either internal housing 318 or 320 to provide a close fit, while permitting free sliding of the internal housings 318 and 320. The top portion and bottom portion of the external housing 302 each have a width that is about 2 times the width of either internal housing 318/320. Extending upwards from one end of internal housing 318 is a blocking flap 322. Extending downwards from one end of internal housing 320 is a blocking flap 324. Both blocking flaps 322 and 324 are dimensioned to be similar to that of the end of either internal housing 318/320. If blocking flap 322 is positioned at the rear end relative to the external housing 302, then the blocking flap 324 is positioned at the opposite front end relative to the external housing 302, or vice versa. The function of the blocking flaps 322 and 324 is explained in relation to the pipe adapters 304, 306, 308, 310.

The pipe adapters 304, 306, 308, 310 have the same function as the pipe adapters shown in FIG. 4 and are secured to the ends of the external housing 302 in normal use. Each of the pipe adapters 304, 306, 308, 310 has a first opening facing away from internal housings 318 and 320 configured for attachment to any standard piping, and a second opening facing towards the internal housings 318 and 320. The height dimension of pipe adapters 304, 306, 308, 310 spans the total height of the external housing 302, and the width dimension of pipe adapters 304, 306, 308, 310 is about the same as the width of either internal housing 318 or 320.

When assembled, internal housing 318 can slide side to side within the bottom portion of external housing 302, while internal housing 320 can slide side to side within the top portion of external housing 302 such that the ends of each internal housing 318 or 320 always aligns with the second opening of one of the pipe adapters 304, 306, 308, 310. An actuator 326 is coupled to both internal housings 318 and 320 to move the channels 314 and 316 side to side at predetermined time intervals. The actuator 312 in one example can be a device that pushes/pulls the internal housings 318 and 320. In another example the actuator 312 can include solenoid devices to achieve this push/pull functionality. The actuator 312 is symbolically shown as a box attached to the external housing 302, but can be one or more devices in actual implementation to achieve this desired result.

It should be noted that the positioning and/or sizing of length of the internal housings 318 and 320 are configured such that the blocking flaps 322 and 324 do not collide with the other internal housing. The purpose of the blocking flap is to prevent or minimize fluid flow received by a pipe adapter into either the top portion volume or bottom portion volume of the external housing 302. Therefore, when an internal housing is aligned to the second opening of a pipe adapter, about half the area of the second opening is blocked by the blocking flap, thereby directing fluid flow only into the channel of the internal housing.

In FIG. 6 and FIG. 7, the heat recovery unit 300 is shown in the horizontal orientation. In an alternate installation, the heat recovery unit 300 can be oriented vertically such that the top portion and bottom portion volumes of the external housing 302 appear side to side and the internal housings 318 and 320 slide up and down. The heat recovery unit shown in the present embodiments can be used in any orientation.

Figure 8:
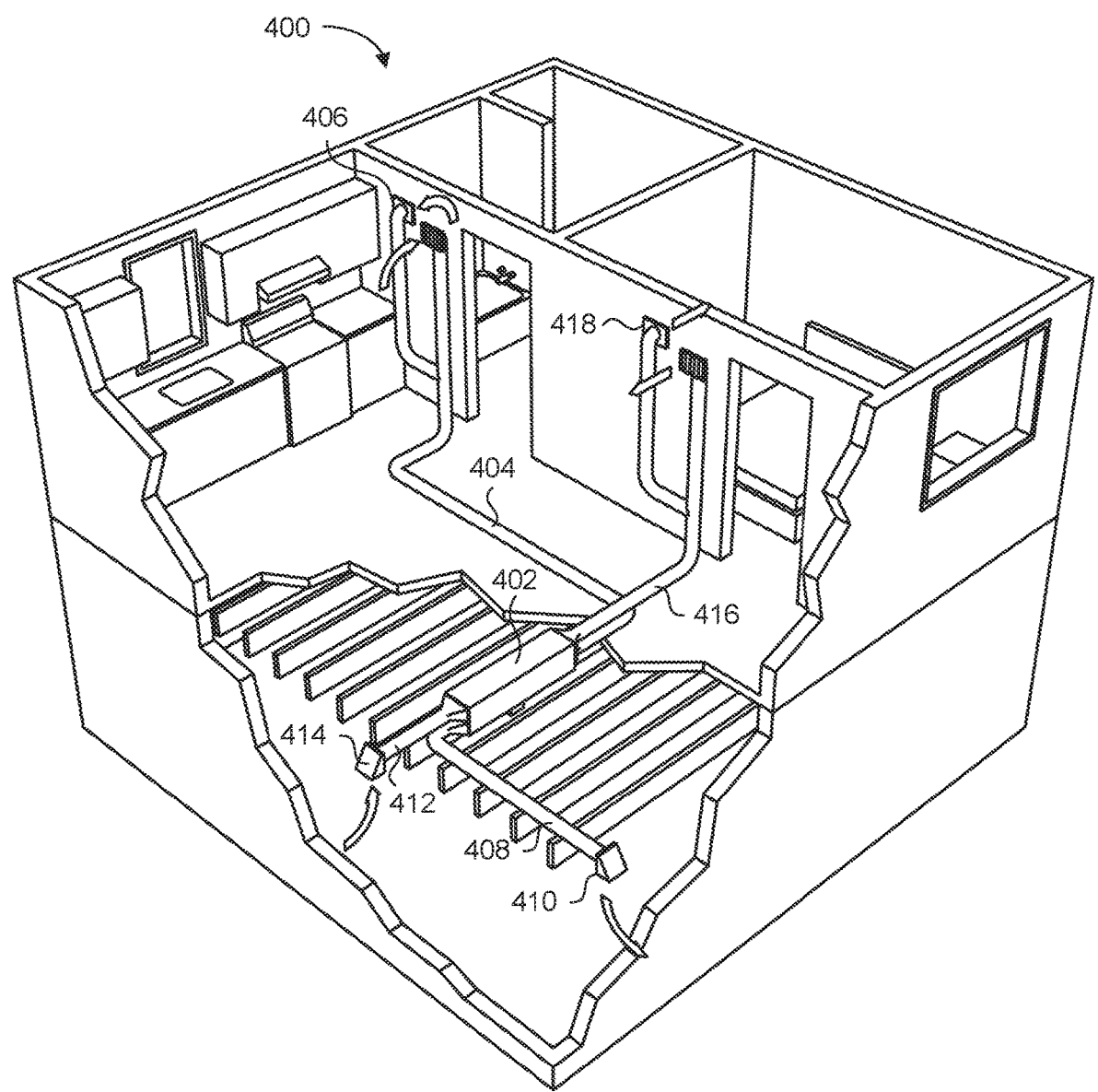
FIG. 8 shows a heating system application of the heat recovery unit of FIG. 6 and FIG. 7, according to an alternate embodiment.

FIG. 8 presents an alternate application of the previously described heat recovery unit embodiments to the one shown in FIG. 5. In the system of FIG. 5, the heat recovery unit 202 is used for preheating combustion air in the application of heating a dwelling using a fire-based appliance. The system of FIG. 8 employs the heat recovery unit shown in FIG. 6 and FIG. 7 to directly pre-heat external air that is distributed into the dwelling.

FIG. 8 shows a perspective view of a dwelling 400 with multiple rooms. Integrated within the walls and under the floor of dwelling 400 is a heat recovery unit 402 connected to a first fluid flow piping system and a second fluid flow piping system. The pipe adapters of heat recovery unit 402 are not numbered in order to simplify the drawing. It is assumed that the dwelling has a heating system such as electric baseboard, steam or water based radiators, or heated floors, portable heaters, fireplace, forced-air furnace, or any other space-heating device that directly heats the air in the dwelling.

The first fluid flow piping system includes exhaust pipe 404 connected between intake vents 406 and a first opening of a pipe adapter, and exhaust pipe 408 connected between a first opening of a pipe adapter and external port 410 positioned outside the wall of dwelling 400. There may be additional exhaust pipes connected to exhaust pipe 404 for drawing air from different rooms in dwelling 400. The second fluid flow piping system includes an inlet pipe 412 connected between external port 414 positioned outside of the dwelling and a first opening of a pipe adapter, and inlet pipe 416 connected between a first opening of a pipe adapter and output vents 418. There may be additional inlet pipes connected to inlet pipe 416 for distributing air to different rooms in dwelling 400.

While not shown in the drawing, blowers can be integrated in line with the exhaust pipes and inlet pipes with air filters to for air in either direction.

The operation of the heat recovery unit 402 shown in FIG. 8 for dwelling 400 operates very similar to the one shown in FIG. 5. At initial startup, it is assumed that the heating system of the dwelling has been inactive for some time, therefore all thermally conductive cores of the heat recovery unit 402 are at indoor ambient temperature. As the air in the dwelling heats up by means of the heating system, stale warm air is drawn into the exhaust pipe 404, through an internal channel of heat recovery unit 402 and out through external port 410. The thermally conductive core heats up and for some predetermined time, the channels are switched by the actuator to be aligned with a different pair of pipe adapters, namely the pipe adapters connected to the inlet pipes 412 and 416. Hence the colder air outside the dwelling is warmed by the heated thermally conductive core. At the same time, the thermally conductive core of other channel is warmed. Therefore, the amount of energy required to heat the pre-heated air from outside of the dwelling to the desired internal temperature is decreased.

Similar to the previously described system of FIG. 5, a controller (not shown) connected to the actuator can be programmed to trigger another switch of the internal channels and their respective thermally conductive cores at a predetermined time. This predetermined time can be set based on any combination of the known flow rate of the heated exhaust air, the received external air, the temperature of the heated exhaust air, and the temperature of the external air from outside. Temperature and flow rate sensors can be used to provide input for determination by the controller as to when the internal channels should be switched by the actuator 312.

The previously described embodiments of the heat recovery unit and systems they are used within, illustrate how two thermally conductive cores in their own respective channels can be used to improve either combustion efficiency or air heating efficiency. Alternately, certain embodiments can be configured for energy recovery in a hot climate during a building cooling function. By example with reference to the embodiment of FIG. 8, instead of a space heater to heat the room, an air conditioning unit can reduce the temperature in the room. Cool stale air is then vented out through exhaust pipe 404, thereby cooling a core of the heat recovery apparatus 402. When this core is switched over, drawn outside warm air is cooled by the heat recovery apparatus 402 before entering the room. If the outside warm air is also moist, then the cool core provides an additional function of condensing the moisture, thereby removing it from the air to be provided to the room. The heat recovery apparatus 402 can be configured to include a moisture collecting area with a drain hole to allow any accumulated water to be removed from the unit.

In the above-described examples, the space heater and air conditioning unit can be referred to as thermal comfort appliances configured to regulate the desired temperature of the dwelling, and can include larger heating systems and cooling systems which achieve the same desired effect. Regardless of the heating or cooling application of the present embodiments, an appliance changes the temperature of an ambient fluid, to thereby provide a conditioned fluid. Thermal energy of the conditioned fluid is transferred with the thermally conductive core, which is eventually switched over to transfer thermal energy with the ambient temperature fluid.

Figure 9:
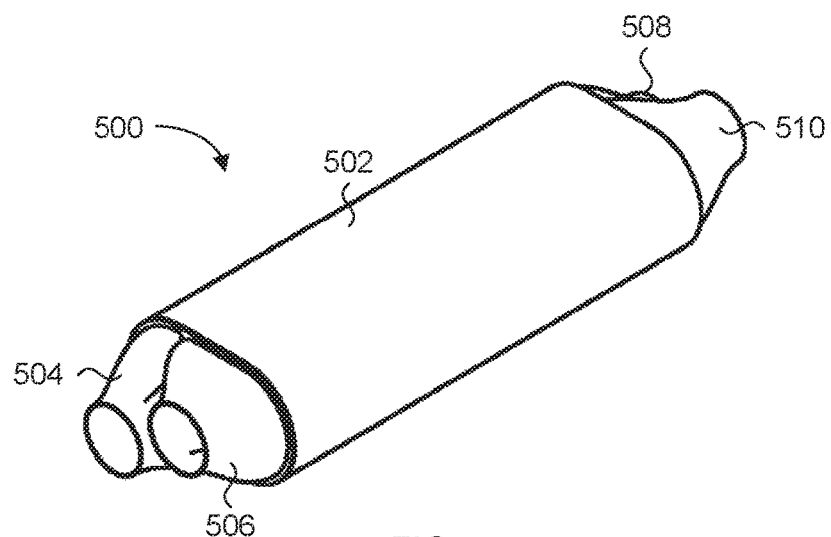
FIG. 9 is a perspective view of a heat recovery unit, according to an alternate embodiment.
Figure 10:
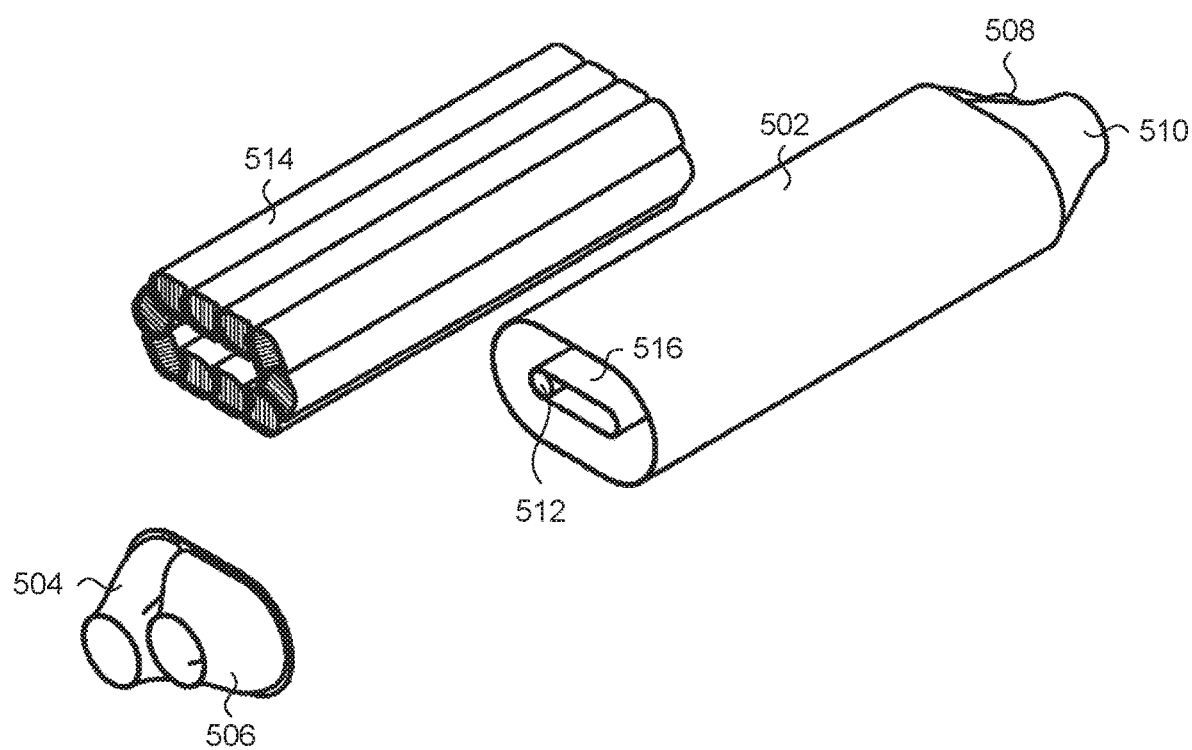
FIG. 10 is an exploded view showing the internal components of the heat recovery unit of FIG. 9, according to the alternate embodiment.

In an alternate embodiment, the heat recovery unit can have more than two thermally conductive cores. FIG. 9 is a perspective view of a heat recovery unit according to a present embodiment. FIG. 10 is an exploded view showing the internal components of the heat recovery unit of FIG. 9. The heat recovery unit 500 shown in FIG. 9 includes an external housing 502, pipe adapters 504, 506, 508, 510, and an actuator 512. Coupled together inside the external housing 502 are multiple internal housings 514 each with a respective thermally conductive core. Each internal housing 514 can be pivotably coupled to an adjacent internal housing 514. The internal housings 514 can be arranged along an internal track surrounding the hub 516 within the external housing 502, and moved by the actuator 512. Alternately, the internal housings 514 can be connected to a flexible belt driven by the actuator 512. Any type of movement apparatus can be used, and can be one or more devices in actual implementation to achieve this desired result.

As with the previous embodiments, the pipe adapters 504, 506, 508, 510 have a first opening facing away from the internal housings 514 and have a second opening facing toward the internal housings 514. In this particular embodiment of FIG. 9 and FIG. 10, the second openings are sized for alignment with a specific number of sequential internal housings 514. This grouping of specific number of sequential internal housings 514 then function in the same way as a single channel with a single thermally conductive core. The actuator can then be controlled to periodically move or shift all internal housings 514 by a distance corresponding to a single internal housing 514. This means that during the shifting, exactly one internal housing 514 moves from alignment with the second opening of a first pipe adapter and into alignment with the second opening of a second and adjacent pipe adapter. Alternately, the actuator can be controlled to periodically move or shift all internal housings 514 by a distance that is a multiple of a single internal housing 514.

In alternate embodiments, there can be a configuration with more than two pipe adapters at each end of the external housing 502, where each pipe adapter is sized to align with one or more internal housings 514.

Figure 11:
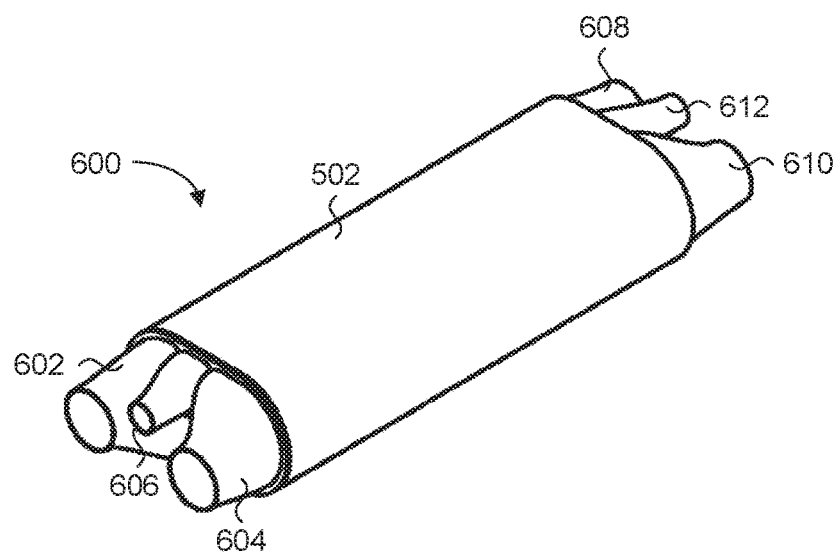
FIG. 11 is a perspective view of a heat recovery unit, according to an alternate embodiment.
Figure 12:
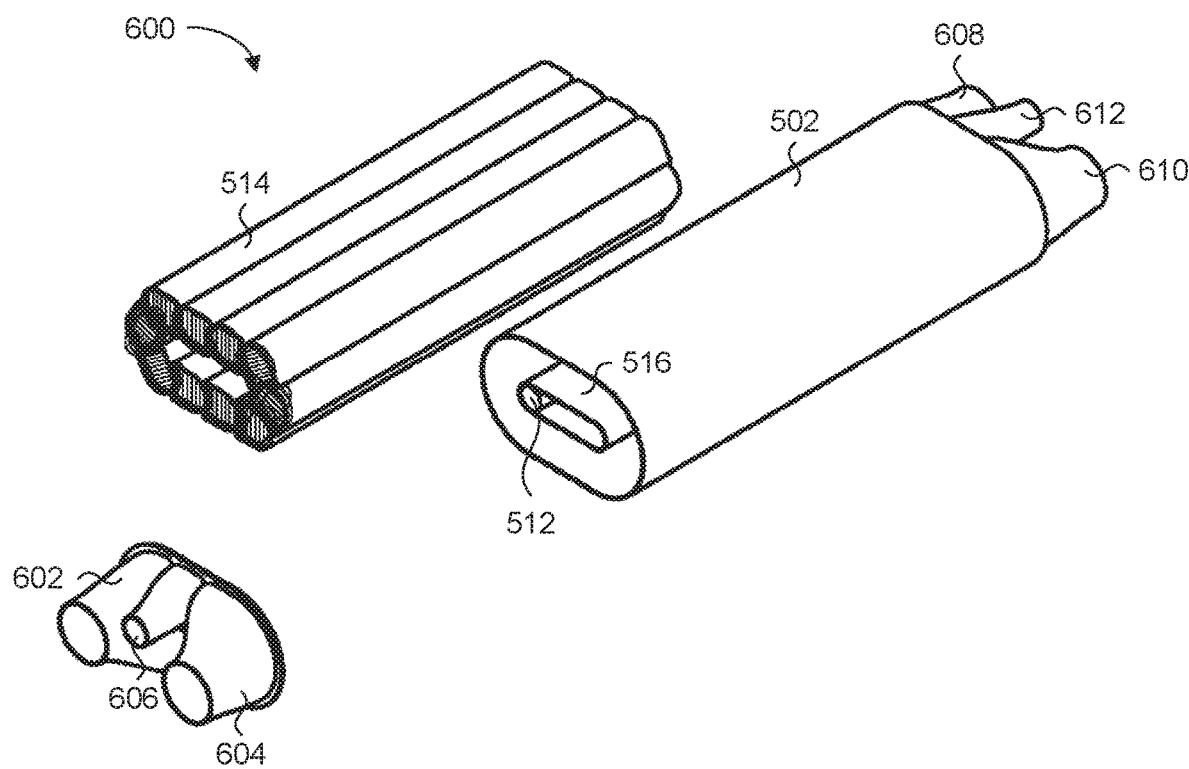
FIG. 12 is an exploded view showing the internal components of the heat recovery unit of FIG. 11, according to the alternate embodiment.

The embodiment of FIG. 11 and FIG. 12 illustrates such an example where the heat recovery unit is configured to have more than two pipe adapters at each end. FIG. 11 is a perspective view of a heat recovery unit according to a present embodiment. FIG. 12 is an exploded view showing the internal components of the heat recovery unit of FIG. 11. Heat recovery unit 600 is almost identical to the heat recovery unit 500 shown in FIG. 9, and therefore the same reference numbers are used to identify the same components between the embodiments.

The embodiment of FIG. 11 and FIG. 12 differs from that of FIG. 9 and FIG. 10 in that both ends of the external housing 502 have 3 pipe adapters. At one end of external housing 502 are pipe adapters 602, 604 and 606. At the opposite end of external housing are pipe adapters 608, 610 and 612. As in the previous embodiments, pairs of pipe adapters are aligned with each other along a linear axis of the external housing 502. For example, pipe adapters 602 and 608 align with each other.

In this present embodiment, pipe adapter pair 606, 612 are sized to align with exactly one internal housing 514, while the other pipe adapter pairs 602, 608 and 604, 610 are sized to align with groups of internal housings 514. Each grouping of internal housings 514 therefore functions as respective single channels. In this configuration, pipe adapter pair 602, 608 can receive heated fluid for heating the thermally conductive cores of the group of internal housings 514, while pipe adapter pair 604, 610 can receive cool fluid to be heated by a previously heated thermally conductive core. Pipe adapter pair 606, 612 provides a purge function to remove any residual fluid from an internal housing 514 that previously received the fluid from a different fluid flow stream. The purge flow stream can be entirely separate and consist of a different fluid than the other two flow streams. An application of a purge function is shown in the example system of FIG. 13.

Figure 13:
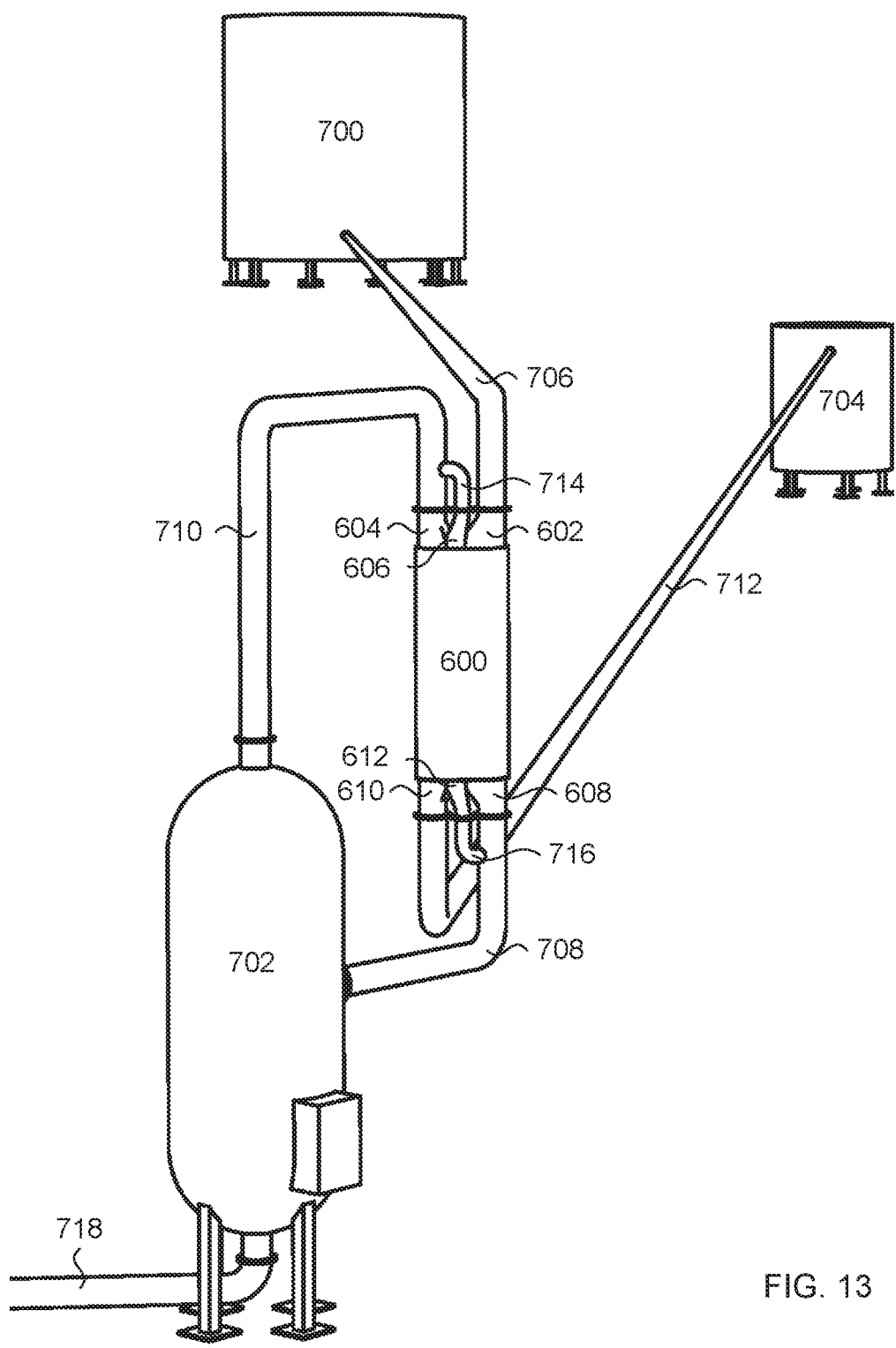
FIG. 13 shows a heating system application of the heat recovery unit of FIG. 11 and FIG. 12, according to an alternate embodiment; and, FIG. 14 is a flowchart of a method of operating the heat recovery units, according to a present embodiment.

FIG. 13 shows a heavy oil/diluent separation system that employs the heat recovery unit of FIG. 11 and FIG. 12. In the system, diluent is added to heavy oil to reduce its viscosity for transport through pipelines at low temperatures. The system of FIG. 13 includes a heavy oil and diluent tank 700, the heat recovery unit 600, a separation device 702, a diluent storage tank 704, a first fluid flow piping system, a second fluid flow piping system, and a third fluid flow piping system.

The first fluid flow piping system includes an inlet pipe 706 connected between the heavy oil and diluent tank 700 and pipe adapter 602, and inlet pipe 708 connected between pipe adapter 608 and the separation device 702. The second fluid flow piping system includes a process pipe 710 connected between the separation device 702 and pipe adapter 604, and process pipe 712 connected between pipe adapter 610 and the diluent storage tank 704. The third fluid flow piping system includes a purge pipe 714 connected between process pipe 710 and pipe adapter 606, and a purge pipe 716 connected between pipe adapter 612 and inlet pipe 708.

It is assumed that the internal housings 514 of heat recovery unit 600 are actuated such that they shift by the distance of a single internal housing 514, and in a direction from pipe adapters 602 to 606 then to 604. The operation of the system of FIG. 13 is now discussed.

The relatively cold mixture of heavy oil and diluent is pumped into the channel consisting of multiple internal housings 514 aligned to the opening of pipe adapter 602 via inlet pipe 706 from heavy oil and diluent tank 700. It is assumed that the thermally conductive cores of these internal housings have been previously heated in a process that will be described later. The preheated mixture exits this channel via pipe adapter 608 and inlet pipe 708, and is provided to separation device 702.

The separation device 702 includes a heater to boil off the diluent in order to separate the two fluids from one another. Because the mixture has been preheated, less energy is required to boil off the diluent. Now the non-diluted heavy oil is pumped out of the separator for further processing via oil pipe 718. Due to the heating process within separation device 702, evaporated diluent leaves the separation device 702 through process pipe 710 and enters another channel consisting of another group of internal housings aligned to the opening of pipe adapter 604. Heat of the diluent is then transferred into the thermally conductive cores of these internal housings, and the cooled diluent exits the channel and is transferred to the storage tank 704 via process pipe 712 for later reuse.

Returning to the evaporated diluent passing through process pipe 710, some of the evaporated diluent is directed into purge pipe 714 and into one of the internal housings aligned to the opening of pipe adapter 606. Due to the shift direction of the internal housings, the presently aligned internal housing with pipe adapter 606 had previously received the mixture of heavy oil and diluent from inlet pipe 706. Therefore any leftover mixture in the present internal housing is now purged into inlet pipe 708 via pipe adapter 612 and purge pipe 716 for recirculation into the separator device 702. Therefore this left over mixture is treated for further separation of the heavy oil from the diluent. Now the purged core of the internal housing is free of heavy oil and is later shifted into alignment with the opening of pipe adapter 604 to receive evaporated diluent.

The previously illustrated systems of FIG. 5, FIG. 8 and FIG. 13 using the heat recovery unit embodiments follow a common method of operation. This method is summarized in the flowchart of FIG. 14, and assumes that the thermal comfort system being employed is one of a heating system or a cooling system.

Figure 14:
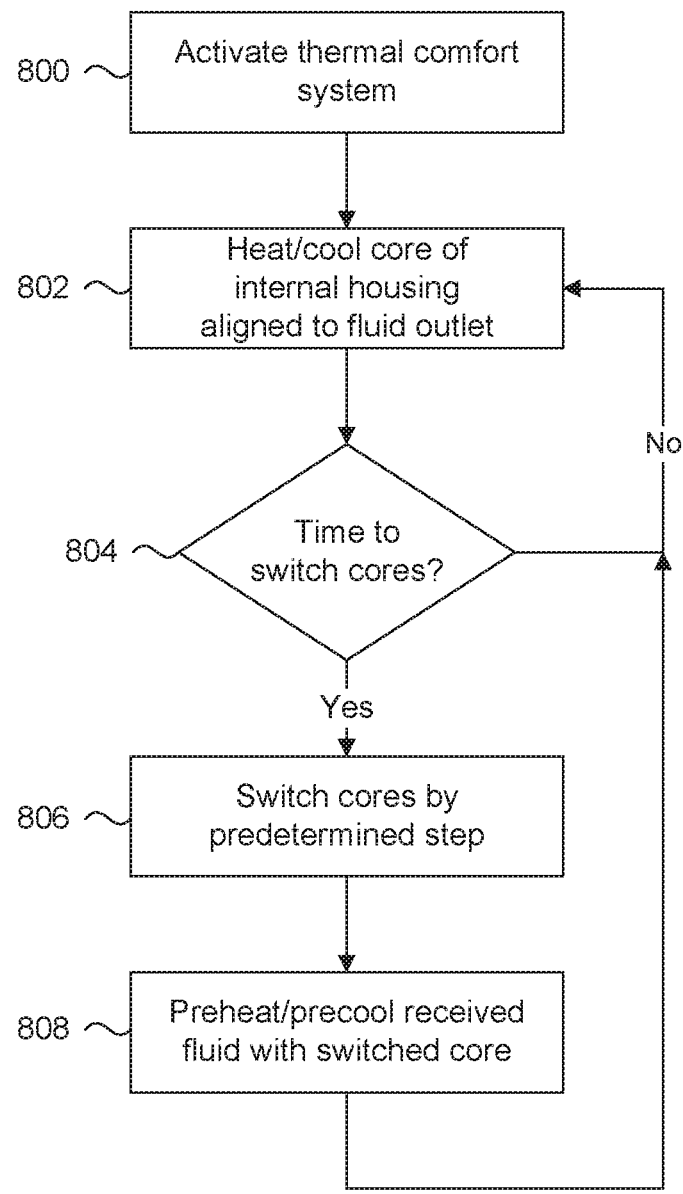

The method of FIG. 14 is first discussed for a heating system. It is assumed that the entire system is at ambient temperature, meaning that the thermal comfort system has been inactive. The method therefore starts at step 800 by activating the thermal comfort system. This can be a fire or electric based appliance. The flow stream of heated or fluid is used to heat the thermally conductive cores of one or more internal housings of the heat recovery unit at 802. A determination is then made at 804 if it is time to switch thermally conductive cores, namely moving out the heated thermally conductive core and channel to a different position. As previously described, this time can be determined based on any combination of parameters programmed into a micro controller. If the thermally conductive core should not be switched yet, then the heating of the core continues at 802.

Eventually it is determined at 804 that the thermally conductive core has been subjected to a sufficient amount of heating and the method proceeds to step 806. At 806, the actuator of the heat recovery unit is enabled or triggered to move the internal housing containing the heated thermally conductive core by a predetermined step. In one example this predetermined step can switch the core from one fluid flow stream to a different fluid flow stream. Following at 808, the heated thermally conductive core now preheats fluid from a different fluid flow stream. Occurring concurrently back at step 802, another thermally conductive core is being heated, and the process repeats. Eventually the initially heated thermally conductive core is cooled as its stored heat is dissipated, and the cycle of switching cores continues. Accordingly in the heating application, wasted heat occurring as a byproduct of the heating operation is reused to increase heating efficiency of the system, thereby reducing energy consumption cost.

The method of FIG. 14 is discussed again, but this time for a cooling system. It is assumed that the entire system is at ambient temperature, meaning that the thermal comfort system has been inactive. The method therefore starts at step 800 by activating the thermal comfort system. This can be any type of cooling appliance. The flow stream of cooled fluid is used to cool the thermally conductive cores of one or more internal housings of the heat recovery unit at 802. A determination is then made at 804 if it is time to switch thermally conductive cores, namely moving out the cooled thermally conductive core and channel to a different position. As previously described, this time can be determined based on any combination of parameters programmed into a micro controller. If the thermally conductive core should not be switched yet, then the cooling of the core continues at 802.

Eventually it is determined at 804 that the thermally conductive core has been subjected to a sufficient amount of cooling and the method proceeds to step 806. At 806, the actuator of the heat recovery unit is enabled or triggered to move the internal housing containing the cooled thermally conductive core by a predetermined step. In one example this predetermined step can switch the core from one fluid flow stream to a different fluid flow stream. Following at 808, the cooled thermally conductive core now precools fluid from a different fluid flow stream. Occurring concurrently back at step 802, another thermally conductive core is being cooled, and the process repeats. Eventually the initially cooled thermally conductive core is warmed, and the cycle of switching cores continues. Accordingly, in the cooling application, exhausted cooled air is reused to increase the cooling efficiency of the system, thereby reducing energy consumption cost.

Accordingly, systems using the disclosed heat recovery unit provides additional advantages over known heat recovery units. For example, the amount of ducting or piping required as well as the amount of fluid that is transferred between flows when the thermally conductive cores switch positions in comparison to heat wheels and stationary dual core heat recovery units is reduced. Because the internal housings and respective thermally conductive cores are stationary for the majority of the time, the wearing of seals is minimized. The presently described heat recovery unit embodiment can be adapted to include a purge cycle to virtually eliminate cross-contamination when different types of fluids are in contact with the internal housing and thermally conductive core.

In HVAC applications, extremely low temperatures are present and frost buildup can occur on the thermally conductive cores. However, the presently described heat recovery unit embodiments are continuously self-defrosting as any thermally conductive core with frost buildup will always be exposed to heated exhaust fluid flow. The embodiments of the described heat recovery apparatus can therefore be configured to include a drain for directing away the accumulation of water due to defrosting. This results in improved efficiency relative to systems that require a separate defrost cycle that interrupts the normal intended operation of the unit.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A heat recovery unit for fluids, comprising:
    first and second internal channels within an external housing, each configured to transfer separate fluid flows between a respective pair of pipe adapters in sealed connection to ends of the external housing, where a first fluid flow includes conditioned fluid and a second fluid flow includes ambient fluid different in temperature than the conditioned fluid;
    thermally conductive cores within each of the first and the second internal channels and thermally isolated from each other, where each thermally conductive core transfers thermal energy with the conditioned fluid or with the ambient fluid; and
    an actuator configured to move the first and the second internal channels between different pairs of the pipe adapters at intervals.

2. The heat recovery unit of claim 1, wherein the external housing is cylindrical shaped, and the first and second internal channels are semi-circle shaped and connected to each other.

3. The heat recovery unit of claim 2, wherein the first and second internal channels are rotatable about a central axis of the cylindrical shaped external housing.

4. The heat recovery unit of claim 1, wherein each of the pipe adapters has
    a first opening configured for connection to a pipe, and
    a second opening configured with a size and shape matching the size and the shape of both the first and the second internal channels.

5. The heat recovery unit of claim 1, wherein the external housing is rectangular shaped and subdivided into a top portion and a bottom portion, where the first internal channel is positioned within and configured to slide in the top portion and the second internal channel is position within and configured to slide in the bottom portion.

6. The heat recovery unit of claim 5, wherein the first internal channel and the second internal channel include internal housings rectangular in shape.

7. The heat recovery unit of claim 6, wherein
    the first internal housing includes a first blocking flap at an end of the first internal housing extending towards the bottom portion,
    the second internal housing includes a second blocking flap at another end opposite to the end of the first internal housing extending towards the top portion,
    the first blocking flap and a first internal housing opening having a combined area matching an area of the second opening of each pipe adapter, and
    the second blocking flap and a second internal housing opening having a combined area matching the area of the second opening of each pipe adapter.

8. The heat recovery unit of claim 1, further including a plurality of internal channels including the first and the second internal channels, each of the plurality of internal channels being configured as an internal housing pivotally coupled to adjacent internal housings.

9. The heat recovery unit of claim 8, wherein each of the pipe adapters has
    a first opening configured for connection to a pipe, and
    a second opening configured with a size and shape matching the size and the shape of a predetermined group of sequential internal housings.

10. The heat recovery unit of claim 9, wherein the actuator is configured to move all the internal housings by a distance corresponding to a single internal housing such that exactly one internal housing moves from alignment with the second opening of a first pipe adapter and into alignment with the second opening of a second and adjacent pipe adapter.

11. The heat recovery unit of claim 9, wherein the actuator is configured to move all the internal housings by a distance corresponding to a multiple of internal housings such that exactly the multiple of internal housings moves from alignment with the second opening of a first pipe adapter and into alignment with the second opening of a second and adjacent pipe adapter.

12. The heat recovery unit of claim 9, further including a pair of purge pipe adapters in sealed connection to ends of the external housing, each having a first opening configured for connection to a pipe and a second opening configured with a size and shape matching the size and the shape of one internal housing.

13. A system with integrated heat recovery, comprising:
   a thermal appliance configured to condition a fluid by changing its temperature;
   a first piping system configured to transfer the conditioned fluid to the exterior of a structure;
   a second piping system configured to transfer ambient temperature fluid from the exterior of the structure to the interior of the structure; and,
   a heat recovery unit having
      first and second internal channels within an external housing, each configured to transfer separate fluid flows between a respective pair of pipe adapters in sealed connection to ends of the external housing, where a first fluid flow includes the conditioned fluid and a second fluid flow includes the ambient temperature fluid;
      thermally conductive cores within each of the first and the second internal channels and thermally isolated from each other, where each thermally conductive core transfers thermal energy with the conditioned fluid or with the ambient temperature fluid; and
      an actuator configured to move the first and the second internal channels between different pairs of the pipe adapters at intervals, where one pair of the pipe adapters are connected in line with the first piping system and the other pair of the pipe adapters are connected in line with the second piping system.

14. The system of claim 13, wherein the thermal appliance includes a fire based appliance.

15. The system of claim 14, wherein the ambient temperature fluid is air for feeding the combustion process of the fire based appliance, and the conditioned fluid is combustion exhaust gas.

16. The system of claim 13, wherein the thermal appliance includes a space heating or cooling device that directly heats or cools air in a structure, where the structure is a dwelling.

17. The system of claim 16, wherein the ambient temperature fluid is fresh external air for circulation in the dwelling, and the conditioned fluid is stale, heated or cooled air from within the dwelling.

18. A method for operating a heat recovery unit for a dwelling, comprising:
   a) activating a thermal comfort system;
   b) aligning a first internal channel of the heat recovery unit to a fluid outlet for receiving a first fluid from the thermal comfort system;
   c) changing the temperature of a first thermally conductive core in the first internal channel with the first fluid;
   d) switching the first internal channel with a second internal channel of the heat recovery unit having a second thermally conductive core after a predetermined delay of time; and,
   e) aligning the first internal channel to a fluid inlet for receiving and changing the temperature of a second fluid with the first thermally conductive core.

19. The method of claim 18, wherein aligning the first internal channel to a fluid inlet includes concurrently aligning the second internal channel to the fluid outlet.

20. The method of claim 18, wherein the thermal comfort system is a heating or cooling system, the first fluid is conditioned fluid, and the second fluid is ambient fluid different in temperature than the first fluid.

* * * * *